United States Patent
Chen et al.

(10) Patent No.: US 7,956,553 B2
(45) Date of Patent: Jun. 7, 2011

(54) LIGHT SOURCE DRIVING CIRCUIT

(75) Inventors: Bi-Hsien Chen, Pingtung County (TW);
Han-Yu Chao, Tainan County (TW);
Shin-Chang Lin, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 153 days.

(21) Appl. No.: 12/536,503

(22) Filed: Aug. 6, 2009

(65) Prior Publication Data
US 2009/0295298 A1    Dec. 3, 2009

Related U.S. Application Data

(62) Division of application No. 11/775,237, filed on Jul. 10, 2007, now Pat. No. 7,592,755.

(30) Foreign Application Priority Data

Oct. 16, 2006  (TW) ................................. 95138011 A

(51) Int. Cl.
*H05B 37/02*    (2006.01)
(52) U.S. Cl. .......................... 315/291; 315/307; 315/308
(58) Field of Classification Search .................. 315/224, 315/307, 308, 291, 312, 193, 185 R, 192
See application file for complete search history.

(56) References Cited

U.S. PATENT DOCUMENTS 7,151,346 B2 * 12/2006 Sanchez ......................... 315/308
7,321,203 B2 *  1/2008 Marosek ........................ 315/247

* cited by examiner

*Primary Examiner* — David Hung Vu
(74) *Attorney, Agent, or Firm* — Jianq Chyun IP Office

(57) ABSTRACT

A light source driving circuit includes a power supply circuit, a first dimming circuit, and a control circuit. The power supply circuit has a control terminal and an output terminal that is connected to a terminal of a first light-emitting element. The first dimming circuit has a first terminal connected to the other terminal of the first light-emitting element, a second terminal connected to a common potential, and a pulse width signal input terminal. The control circuit is connected between the pulse width input terminal of the first dimming circuit and the control terminal of the power supply circuit. The first dimming circuit determines an ON/OFF state according to a logic state of the pulse width signal. The power supply circuit determines whether or not to output the voltage. The control circuit delays the power supply circuit, turns off the power supply circuit, and delays the first dimming circuit.

33 Claims, 6 Drawing Sheets

LIGHT SOURCE DRIVING CIRCUIT

CROSS-REFERENCE TO RELATED APPLICATION

This application is a divisional application and claims the priority benefit of U.S. application Ser. No. 11/775,237, filed on Jul. 10, 2007, now U.S. Pat. No. 7,592,755, which claims the priority benefit of Taiwan application Ser. No. 95138011, filed on Oct. 16, 2006. The entirety of each of the above-mentioned patent applications is hereby incorporated by reference herein and made a part of this specification.

BACKGROUND OF THE INVENTION

1. Field of Invention

The present invention relates to a driving circuit. More particularly, the present invention relates to a light source driving circuit for driving a light-emitting element.

2. Description of Related Art

Light source driving circuits have been widely applied in various display devices, for example, backlight driving circuits of LCDs, or LED driving circuits of handheld mobile devices. As display devices are increasingly used in various electronic products, the light source driving circuits have a great potential for development, and many advantages of the circuits, such as power conversion efficiency and stability, can be improved and enhanced continuously.

The architecture of a conventional light source driving circuit for driving an LED string 101 is shown in FIG. 1. The LED string 101 includes a plurality of LEDs 102 strung together. The conventional light source driving circuit includes a DC/DC power converter 103, a capacitor 104, an output voltage feedback circuit 105, a timing control circuit 106, and a dimming circuit 107. The dimming circuit 107 is connected between a cathode of the LED string 101 and a common potential GND, and receives a pulse width signal PWM from the output of the timing control circuit 106. In addition, the output voltage feedback circuit 105 is implemented by two resistors 108 and 109 connected in series.

The DC/DC power converter 103 supplies a DC source voltage to the LED string 101, and performs a feedback control according to a feedback signal FB received by the output voltage feedback voltage 105, so as to stably output a DC source voltage. The timing control circuit 106 determines the width of the signal according to the luminance set by the user. The dimming circuit 107 is turned on as the signal is at a high level, and is turned off as the pulse width is at a low level. By adjusting the width of the pulse width signal, the ON/OFF state of the dimming circuit 107 can be controlled, so as to further control the LED string 101 to whether or not allow a current passing through.

Thus, when the luminance is set to high, the time that the pulse width signal remains at the high level is long, such that the duration of turning on the dimming circuit 107 is long, and the luminance of the LED string 101 is high. On the contrary, when the luminance is set to low, the time that the pulse width signal remains at the high level is short, such that the turn-on time of the dimming circuit 107 is short, and the luminance of the LED string 101 is low.

However, when the pulse width signal is at the low level, the dimming circuit 107 is turned off (i.e., the electrical path between the cathode of the LED string 101 and the common potential GND is not turned on), and at this time, the voltage drop of the DC source voltage supplied by the DC/DC power converter 103 completely falls on the dimming circuit 107. When the LED string 101 includes lots of LEDs 102 connected in series, the DC source voltage supplied by the DC/DC power converter 103 will have a high voltage value.

Under this circumstance, if the voltage tolerance of the dimming circuit 107 is not high enough, the dimming circuit 107 will be damaged by the DC source voltage supplied by the DC/DC power converter 103. Moreover, the dimming circuit 107 with a higher voltage tolerance can be used. However, the dimming circuit 107 with the higher voltage tolerance requires larger space and has a higher price, which not only increases the volume of the entire circuit, but also increases the cost. Thus, the market competition force of this product is reduced.

SUMMARY OF THE INVENTION

The present invention is directed to a light source driving circuit for adaptively adjusting an output voltage and delaying a dimming circuit to turn off as the light source driving circuit stops outputting a source voltage to a light-emitting element, so as to prevent inner components of the light source driving circuit from being damaged and prolong the service life of the light source driving circuit.

The present invention is also directed to a light source driving circuit for reducing the cost of the inner components of the light source driving circuit, so as to improve the competition force of the product.

According to the aforementioned and other objectives, the present invention provides a light source driving circuit for driving a light-emitting element. The light source driving circuit comprises a power supply circuit, a dimming circuit, and a feedback circuit. The power supply circuit comprises an output terminal and a feedback terminal, wherein the output terminal is connected to a terminal of the light-emitting element to supply a source voltage to the light-emitting element, and the power supply circuit determines a value of the source voltage according to a feedback signal received by the feedback terminal.

The dimming circuit has first terminal, second terminal, and a pulse width signal input terminal, wherein the first terminal is connected to terminal of the light-emitting element, and the second terminal is connected to a common potential. The feedback circuit is connected between the pulse width signal input terminal of the dimming circuit and the feedback terminal of the power supply circuit, for receiving and transmitting a pulse width signal to the pulse width signal input terminal of the dimming circuit, such that the dimming circuit determines an ON/OFF state between the first terminal and the second terminal according to a logic state of the pulse width signal. Moreover, the feedback circuit turns off the power supply circuit to stop supplying the source voltage and delays the dimming circuit to turn off according to a specific logic state of the pulse width signal.

According to the aforementioned and other objectives, the present invention provides a light source driving circuit for driving light-emitting element. The light source driving circuit comprises a power supply circuit, a dimming circuit, and a control circuit. The power supply circuit has an output terminal and a control terminal, wherein the output terminal is connected to a terminal of the light-emitting element to supply a source voltage to the light-emitting element. The dimming circuit has a first terminal, a second terminal, and a pulse width signal input terminal, wherein the first terminal is connected to another terminal of the light-emitting element and the second terminal is connected to a common potential.

The control circuit is connected between a pulse width signal input terminal of the dimming circuit and a control terminal of the power supply circuit, for receiving and transmitting a pulse width signal to the pulse width signal input terminal of the dimming circuit and the control terminal of the power supply circuit. Thus, the dimming circuit determines an ON/OFF state between the first terminal and the second terminal according to a logic state of the pulse width signal, and the power supply circuit determines whether or not to output the source voltage according to the pulse width signal received by the control terminal. Moreover, the control circuit delays the power supply circuit to output the source voltage according to a first logic state of the pulse width signal, and the control circuit turns off the power supply circuit to stop outputting the source voltage and delays the dimming circuit to turn off according to a second logic state of the pulse width signal.

According to an embodiment of the present invention, the feedback circuit includes a first diode, a delay circuit, and an output voltage feedback circuit. An anode of the first diode is connected to the feedback terminal of the power supply terminal, and a cathode of the first diode receives the pulse width signal. The delay circuit is connected between the cathode of the first diode and the pulse width signal input terminal of the dimming circuit, for receiving and transmitting the pulse width signal to the pulse width signal input terminal of the dimming circuit and delaying the dimming circuit to turn off as the pulse width signal assumes a specific logic state. The output voltage feedback circuit is connected between the output terminal of the power supply circuit and the feedback terminal of the power supply circuit, for determining a value of the feedback signal according to the source voltage output by the power supply circuit.

The delay circuit comprises a second diode, a first impedance element, and a second impedance element. An anode of the second diode is connected to the cathode of the first diode, and a cathode of the second diode is connected to a pulse width signal input terminal of the first dimming circuit. A terminal of the first impedance element is connected to the anode of the second diode, and the other terminal of the first impedance element is connected to the cathode of the second diode. The second impedance element is connected between the cathode of the second diode and the common potential. The output voltage feedback circuit comprises a third impedance element and a fourth impedance element. A terminal of the third impedance element is connected to the output terminal of the power supply circuit, and another terminal of the third impedance element is connected to the feedback terminal of the power supply circuit. The fourth impedance element is connected between the other terminal of the third impedance element and the common potential.

In this embodiment, the first impedance element, the third impedance element, and the fourth impedance element respectively comprise a resistor, and the second impedance element comprises a capacitor.

According to another embodiment of the present invention, the light source driving circuit is further used for driving a second light-emitting element, wherein a terminal of the second light-emitting element is connected to the output terminal of the power supply circuit, and the light source driving circuit further comprises a second dimming circuit. The second dimming circuit has a first terminal, a second terminal, and a input terminal, wherein the first terminal is connected to the other terminal of the second light-emitting element and the second terminal is connected to a common potential.

The feedback circuit of this embodiment comprises a first diode, a delay circuit, and an output voltage feedback circuit. An anode of the first diode is connected to the feedback terminal of the power supply terminal and a cathode of the first diode receives the pulse width signal. The delay circuit is connected among the cathode of the first diode, the pulse width signal input terminal of the first dimming circuit, and the pulse width signal input terminal of the second dimming circuit, for receiving and transmitting the pulse width signal to the input terminals of the first dimming circuit and the second dimming circuit. Moreover, the delay circuit delays the first dimming circuit and the second dimming circuit to turn off as the pulse width signal assumes a specific logic state. The output voltage feedback circuit is connected between the output terminal of the power supply circuit and the feedback terminal of the power supply circuit, for determining a value of the feedback signal according to the source voltage output by the power supply circuit.

The delay circuit comprises a second diode, a first impedance element, and a second impedance element. An anode of the second diode is connected to the cathode of the first diode, and a cathode of the second diode is connected to the pulse width signal input terminals of the first dimming circuit and the second dimming circuit. A terminal of the first impedance element is connected to the anode of the second diode, and the other terminal of the first impedance element is connected to the cathode of the second diode. The second impedance element is connected between the cathode of the second diode and the common potential. The output voltage feedback circuit comprises a third impedance element and a fourth impedance element. A terminal of the third impedance element is connected to the output terminal of the power supply circuit, and the other terminal of the third impedance element is connected to the feedback terminal of the power supply circuit. The fourth impedance element is connected between another terminal of the third impedance element and the common potential.

In this embodiment, the first impedance element, the third impedance element, and the fourth impedance element comprise a resistor, and the second impedance element comprises a capacitor respectively.

According to another embodiment of the present invention, the light source driving circuit is further used for driving a second light-emitting element, a third light-emitting element, and a fourth light-emitting element. A terminal of the second light-emitting element, the third second light-emitting element, and the fourth second light-emitting element is connected to the output terminal of the power supply circuit, the first dimming circuit further comprises a third terminal which is connected to the other terminal of the third light-emitting element, and the light source driving circuit further comprises a second dimming circuit. The second dimming circuit has a first terminal, a second terminal, a third terminal, and a pulse width signal input terminal, wherein the first terminal is connected to another terminal of the second light-emitting element, the second terminal is connected to the common potential, and the third terminal is connected to another terminal of the fourth light-emitting element. Each of the first dimming circuit and the second dimming circuit determines the ON/OFF state between the first terminal and the second terminal and the ON/OFF state between the third terminal and the second terminal according to the logic state of the pulse width signal.

The feedback circuit of this embodiment comprises a first diode, a first delay circuit, a second delay circuit, and an output voltage feedback circuit. An anode of the first diode is connected to the feedback terminal of the power supply terminal, and a cathode of the first diode receives the pulse width signal. The first delay circuit is connected between the cathode of the first diode and the pulse width signal input terminal of the first dimming circuit, for receiving and transmitting the pulse width signal to the pulse width signal input terminal of the first dimming circuit. Moreover, the first delay circuit delays the first dimming circuit to turn off as the pulse width signal assumes a specific logic state.

The second delay circuit is connected between the cathode of the first diode and the pulse width signal input terminal of the second dimming circuit, for receiving and transmitting the pulse width signal to the pulse width signal input terminal of the second dimming circuit. Moreover, the second delay circuit delays the second dimming circuit to turn off as the pulse width signal assumes a specific logic state. The output voltage feedback circuit is connected between the output terminal of the power supply circuit and the feedback terminal of the power supply circuit, for determining a value of the feedback signal according to the source voltage output by the power supply circuit.

The first delay circuit comprises a second diode, a first impedance element, a second impedance element, and a third impedance element. An anode of the second diode is connected to the cathode of the first diode, and a cathode of the second diode is connected to a pulse width signal input terminal of the first dimming circuit. A terminal of the first impedance element is connected to the anode of the second diode, and the other terminal of the first impedance element is connected to the cathode of the second diode. The second impedance element is connected between the cathode of the second diode and the common potential. The third impedance element is connected between the cathode of the second diode and the pulse width signal input terminal of the first dimming circuit.

The second delay circuit comprises a third diode, a fourth impedance element, a fifth impedance element, and a sixth impedance element. An anode of the third diode is connected to the cathode of the first diode, and a cathode of the third diode is connected to a pulse width signal input terminal of the second dimming circuit. A terminal of the fourth impedance element is connected to the anode of the third diode, and the other terminal of the fourth impedance element is connected to the cathode of the third diode. The fifth impedance element is connected between the cathode of the third diode and the common potential. The sixth impedance element is connected between the cathode of the third diode and the pulse width signal input terminal of the second dimming circuit. The output voltage feedback circuit comprises a seventh impedance element and an eighth impedance element. A terminal of the seventh impedance element is connected to the output terminal of the power supply circuit, and the other terminal of the seventh impedance element is connected to the feedback terminal of the power supply circuit. The eighth impedance element is connected between the other terminal of the seventh impedance element and the common potential.

In this embodiment, the first impedance element, the third impedance element, the fourth impedance element, the sixth impedance element, the seventh impedance element, and the eighth impedance element respectively comprise a resistor, and the second impedance element and the fifth impedance element respectively comprise a capacitor.

According to an embodiment of the present invention, the control circuit comprises a first delay circuit and a second delay circuit. The first delay circuit is connected between the control terminal of the power supply circuit and the pulse width signal, for receiving and transmitting the pulse width signal to the control terminal of the power supply circuit, delaying the power supply circuit to output the source voltage as the pulse width assumes a first logic state, and turning off the power supply circuit to stop supplying the source voltage as the pulse width signal assumes a second logic state. The second delay circuit is connected between the pulse width signal input terminal of the first dimming circuit and the pulse width signal, for receiving and transmitting the pulse width signal to the pulse width signal input terminal of the first dimming circuit, and delaying the first dimming circuit to turn off as the pulse width signal assumes a second logic state.

The first delay circuit comprises a first diode, a first impedance element, and a second impedance element. An anode of the first diode is connected to the control terminal of the power supply terminal, and a cathode of the first diode receives the pulse width signal. A terminal of the first impedance element is connected to the anode of the first diode, and the other terminal of the first impedance element is connected to the cathode of the first diode. The second impedance element is connected between the anode of the first diode and the common potential. The second delay circuit comprises a second diode, a third impedance element, and a fourth impedance element. An anode of the second diode is connected to the pulse width signal, and a cathode of the second diode is connected to the pulse width signal input terminal of the first dimming circuit. A terminal of the third impedance element is connected to the anode of the second diode, and the other terminal of the third impedance element is connected to the cathode of the second diode. The fourth impedance element is connected between the cathode of the second diode and the common potential.

In this embodiment, each of the first impedance element and the third impedance element comprises a resistor, and each of the second impedance element and the fourth impedance element comprises a capacitor.

According to another embodiment of the present invention, the light source driving circuit is further used for driving a second light-emitting element, wherein a terminal of the second light-emitting element is connected to the output terminal of the power supply circuit, and the light source driving circuit further comprises a second dimming circuit. The second dimming circuit has a first terminal, a second terminal, and a pulse width signal input terminal, wherein the first terminal is connected to the other terminal of the second light-emitting element, and the second terminal is connected to a common potential.

The control circuit of this embodiment comprises a first delay circuit and a second delay circuit. The first delay circuit is connected between the control terminal of the power supply circuit and the pulse width signal, for receiving and transmitting the pulse width signal to the control terminal of the power supply circuit, delays the power supply circuit to output the source voltage as the pulse width assumes a first logic state, and turns off the power supply circuit to stop supplying the source voltage as the pulse width signal assumes a second logic state.

The second delay circuit is connected among the pulse width signal input terminal of the first dimming circuit, the pulse width signal input terminal of the second dimming circuit, and the pulse width signal, for receiving and transmitting the pulse width signal to the pulse width signal input terminals of the first dimming circuit and the second dimming circuit, and delays the first dimming circuit and the second dimming circuit to turn off as the pulse width signal assumes a second logic state.

The first delay circuit comprises a first diode, a first impedance element, and a second impedance element. An anode of the first diode is connected to the control terminal of the power supply terminal, and a cathode of the first diode receives the pulse width signal. A terminal of the first impedance element is connected to the anode of the first diode, and the other terminal of the first impedance element is connected to the cathode of the first diode. The second impedance element is connected between the anode of the first diode and the common potential.

The second delay circuit comprises a second diode, a third impedance element, and a fourth impedance element. An anode of the second diode is connected to the pulse width signal, and a cathode of the second diode is connected to the pulse width signal input terminals of the first dimming circuit and the second dimming circuit. A terminal of the third impedance element is connected to the anode of the second diode, and the other terminal of the third impedance element is connected to the cathode of the second diode. The fourth impedance element is connected between the cathode of the second diode and the common potential.

In this embodiment, each of the first impedance element and the third impedance element comprises a resistor, and each of the second impedance element and the fourth impedance element comprises a capacitor.

According to another embodiment of the present invention, the light source driving circuit is further used for driving a second light-emitting element, a third light-emitting element, and a fourth light-emitting element. A terminal of the second light-emitting element, the third second light-emitting element, and the fourth second light-emitting element is connected to the output terminal of the power supply circuit, the first dimming circuit further comprises a third terminal which is connected to the other terminal of the third light-emitting element, and the light source driving circuit further comprises a second dimming circuit. The second dimming circuit has a first terminal, a second terminal, a third terminal, and a pulse width signal input terminal, wherein the first terminal is connected to the other terminal of the second light-emitting element, the second terminal is connected to the common potential, and the third terminal is connected to the other terminal of the fourth light-emitting element. Each of the first dimming circuit and the second dimming circuit determines the ON/OFF state between the first terminal and the second terminal and the ON/OFF state between the third terminal and the second terminal according to the logic state of the pulse width signal.

The control circuit of this embodiment comprises a first delay circuit, a second delay circuit, and a third delay circuit. The first delay circuit is connected between the control terminal of the power supply circuit and the pulse width signal, for receiving and transmitting the pulse width signal to the control terminal of the power supply circuit, delays the power supply circuit to output the source voltage as the pulse width assumes a first logic state, and turns off the power supply circuit to stop supplying the source voltage as the pulse width signal assumes a second logic state.

The second delay circuit is connected between the pulse width signal input terminal of the first dimming circuit and the pulse width signal, for receiving and transmitting the pulse width signal to the pulse width signal input terminal of the first dimming circuit, and delaying the first dimming circuit to turn off as the pulse width signal assumes a second logic state. The third delay circuit is connected between the pulse width signal input terminal of second dimming circuit and the pulse width signal, for receiving and transmitting the pulse width signal to the pulse width signal input terminal of the second dimming circuit, and delaying the second dimming circuit to turn off as the pulse width signal assumes a second logic state.

The first delay circuit comprises a first diode, a first impedance element, and a second impedance element. An anode of the first diode is connected to the control terminal of the power supply terminal, and a cathode of the first diode receives the pulse width signal. A terminal of the first impedance element is connected to the anode of the first diode, and the other terminal of the first impedance element is connected to the cathode of the first diode. The second impedance element is connected between the anode of the first diode and the common potential.

The second delay circuit comprises a second diode, a third impedance element, a fourth impedance element, and a fifth impedance element. An anode of the second diode is connected to the pulse width signal, and a cathode of the second diode is connected to the pulse width signal input terminal of the first dimming circuit. A terminal of the third impedance element is connected to the anode of the second diode, and the other terminal of the third impedance element is connected to the cathode of the second diode. The fourth impedance element is connected between the cathode of the second diode and the common potential. The fifth impedance element is connected between the cathode of the second diode and the pulse width signal input terminal of the first dimming circuit.

The third delay circuit comprises a third diode, a sixth impedance element, a seventh impedance element, and an eighth impedance element. An anode of the third diode is connected to the pulse width signal, and a cathode of the third diode is connected to the pulse width signal input terminal of the second dimming circuit. A terminal of the sixth impedance element is connected to the anode of the third diode, and the other terminal of the sixth impedance element is connected to the cathode of the third diode. The seventh impedance element is connected between the cathode of the third diode and the common potential. The eighth impedance element is connected between the cathode of the third diode and the pulse width signal input terminal of the second dimming circuit.

In this embodiment, each of the first impedance element, the third impedance element, the fifth impedance element, the sixth impedance element, and the eighth impedance element comprises a resistor, and each of the second impedance element, the fourth impedance element, and the seventh impedance element comprises a capacitor.

According to the present invention, when the power supply is turned off to stop supplying the source voltage to the light-emitting element, the dimming circuit is delayed to turn off, thus preventing the breakdown of the dimming circuit caused by an over high voltage. Further, the damage of inner components of the light source driving circuit is prevented, and the service life of the light source driving circuit is prolonged. Moreover, the light source driving circuit does not need the dimming circuit with a high voltage tolerance, thereby reducing the cost of the inner components of the light source driving circuit, and improving the competitiveness of the product.

In order to make the aforementioned and other objectives, features and advantages of the present invention comprehensible, preferred embodiments accompanied with figures is described in detail below.

DESCRIPTION OF EMBODIMENTS

Figure 1:
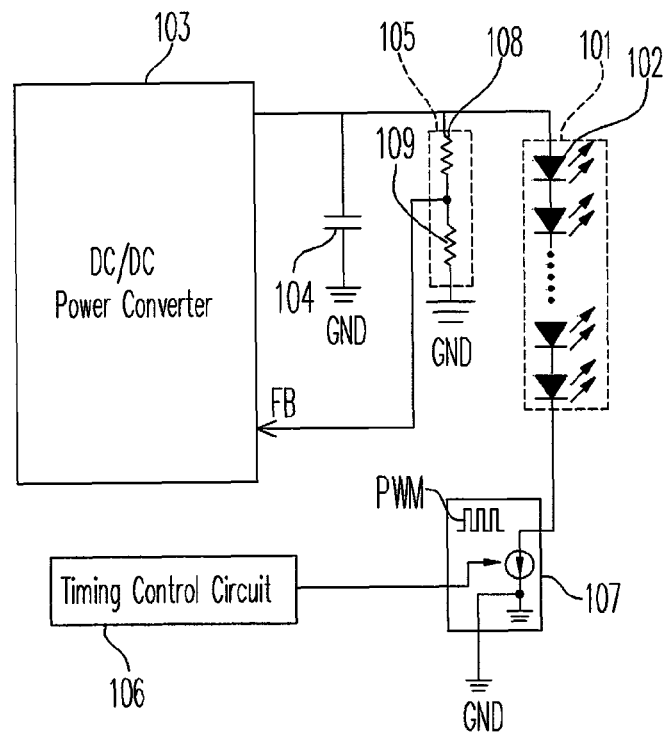
FIG. 1 shows the architecture of a conventional light source driving circuit.
Figure 2:
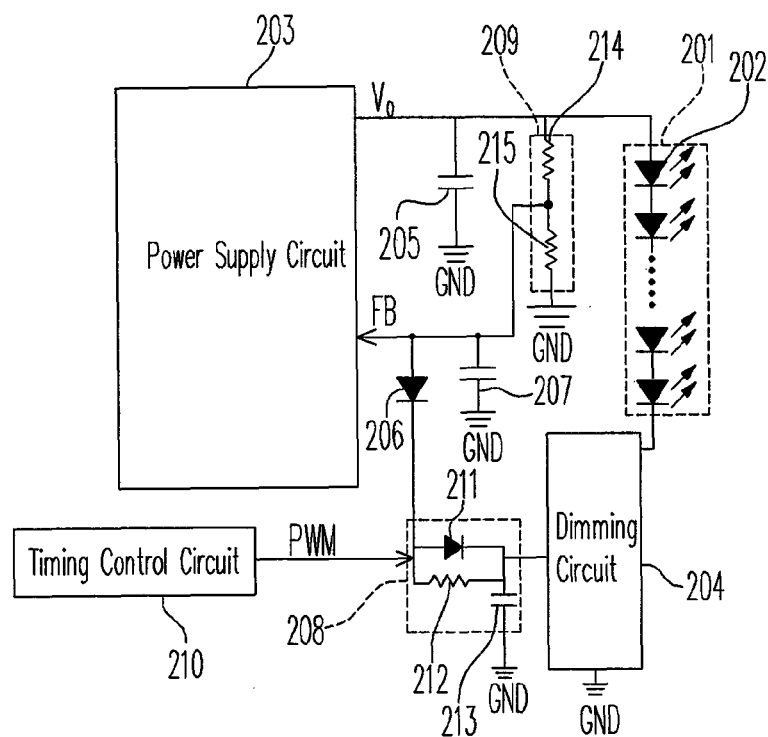
FIG. 2 is a circuit diagram of the light source driving circuit according to first embodiment of the present invention.

FIG. 2 is a circuit diagram of the light source driving circuit to the present invention. Referring to FIG. 2, the light source driving circuit is used for driving a first light-emitting element 201. The first light-emitting element 201 can be an LED, shown as 202 in FIG. 2, or can be an LED string including a plurality of LEDs 202 strung together, or light-emitting elements/light-emitting element strings of other types. The light source driving circuit comprises a power supply circuit 203, a first dimming circuit 204, a capacitor 205, and a feedback circuit.

The power supply circuit 203 comprises an output terminal and a feedback terminal. The output terminal is connected to a terminal of the first light-emitting element 201 to supply a source voltage Vo to the first light-emitting element 201, and the power supply circuit 203 determines a value of the source voltage Vo according to a feedback signal FB received by the feedback terminal. When the feedback signal FB is in a logic high state (i.e., at a high level), the power supply circuit 203 outputs the source voltage Vo. When the feedback signal FB is in a logic low state (i.e., at a low level), the power supply circuit 203 stops outputting the source voltage Vo. However, a user can change the operation mode of the power supply circuit 203 according to actual requirements.

In this embodiment, the first dimming circuit 204 has a first terminal, a second terminal, and a pulse width signal input terminal. The first terminal is connected to the other terminal of the first light-emitting element 201, the second terminal is connected to a common potential GND, and the first dimming circuit 204 determines an ON/OFF state between the first terminal and the second terminal. In this embodiment, when the pulse width signal is in the logic high state, the electrical path between the first terminal and the second terminal of the first dimming circuit 204 is turned on; otherwise, the electrical path is not turned on.

The aforementioned feedback circuit includes a first diode 206, a capacitor 207, a delay circuit 208, and an output voltage feedback circuit 209. The delay circuit 208 receives a pulse width signal PWM, and transmits the pulse width signal PWM to the pulse width signal input terminal of the first dimming circuit 204, and the delay circuit 208 delays the first dimming circuit to turn off as the pulse width signal assumes a specific logic state. The output voltage feedback circuit 209 determines a value of the feedback signal FB according to the source voltage Vo output by the power supply circuit 203. However, the capacitor 205 and the capacitor 207 are used for current rectifying, and are not essential components in the circuit, so the user can use or not use the components according to actual requirements.

The pulse width signal PWM is provided by a timing control circuit 210, in which the timing control circuit 210 converts the luminance setting input by the user to the pulse width signal PWM. When the luminance is set too high, the time that the pulse width signal PWM assumes the logic high state (i.e. high level) is long, such that the turn-on time of the first dimming circuit 204 is long, and the luminance of the first light-emitting element 201 is high. On the contrary, when the luminance is set to low, the time that the pulse width signal PWM assumes the logic high state is short, such that the turn-on time of the first dimming circuit 204 is short, and the luminance of the first light-emitting element 201 is low.

The delay circuit 208 includes a second diode 211, a first impedance element, and a second impedance element. A terminal of the first impedance element is connected to an anode of the second diode 211, and another terminal of the first impedance element is connected to a cathode of the second diode 211. The second impedance element is connected between the cathode of the second diode 211 and the common potential GND. Here, the first impedance element and the second impedance element are implemented by a resistor 212 and a capacitor 213 respectively. The output voltage feedback circuit 209 includes a third impedance element and a fourth impedance element. A terminal of the third impedance element is connected to the output terminal of the power supply circuit 203, and another terminal of the third impedance element is connected to the feedback terminal of the power supply circuit 203. The fourth impedance element is connected between the other terminal of the third impedance element and the common potential GND. Here, the third impedance element and the fourth impedance element are implemented by resistors 214 and 215 respectively.

When the pulse width signal PWM assumes the logic high state, the first diode 206 is turned off, and the second diode 211 is turned on. Therefore, the feedback signal FB assumes the divided voltage on the resistor 215, such that the power supply circuit 203 outputs the source voltage Vo normally, and charges the capacitor 205. As the second diode 211 is turned on at this time, the pulse width signal PWM is transmitted to the pulse width signal input terminal of the first dimming circuit 204 through the second diode 211, and charges the capacitor 213. The first dimming circuit 204 turns on the electrical path between the first terminal and the second terminal according to the pulse width signal PWM received by the pulse width signal input terminal, and starts to sink current, such that the first light-emitting element 210 is turned on and emits light.

When the pulse width signal PWM assumes the logic low state (i.e., the aforementioned specific logic state, or the low level), the first diode 206 is turned on, and the second diode 211 is turned off. Therefore, the voltage level of the feedback signal FB is reduced to the low level, such that the power supply circuit 203 stops outputting the source voltage Vo, and the capacitor 205 starts to discharge. Moreover, at the moment that the power supply circuit 203 stops outputting the source voltage, the source voltage Vo not disappeared and the capacitor 205 discharge through the resistor 214.

When the pulse width signal PWM assumes the logic low state, the second diode 211 is turned off. Therefore, the capacitor 213 starts to discharge through the pulse width signal input terminal of the first dimming circuit 204 and the resistor 212, such that the first dimming circuit 204 is delayed for a period of time to turn off by using the power stored in the capacitor 213. The difference between the time that the power supply circuit 203 stops outputting the source voltage Vo and the time that the first dimming circuit 204 is turned off is the product of the resistance of the resistor 212 and the capacitance of the capacitor 213 (i.e., the RC time constant). As such, when the pulse width signal PWM assumes the logic low state, the breakdown of the first dimming circuit 204 caused by an over high source voltage Vo or the power stored in the capacitor 205 is prevented.

Figure 3:
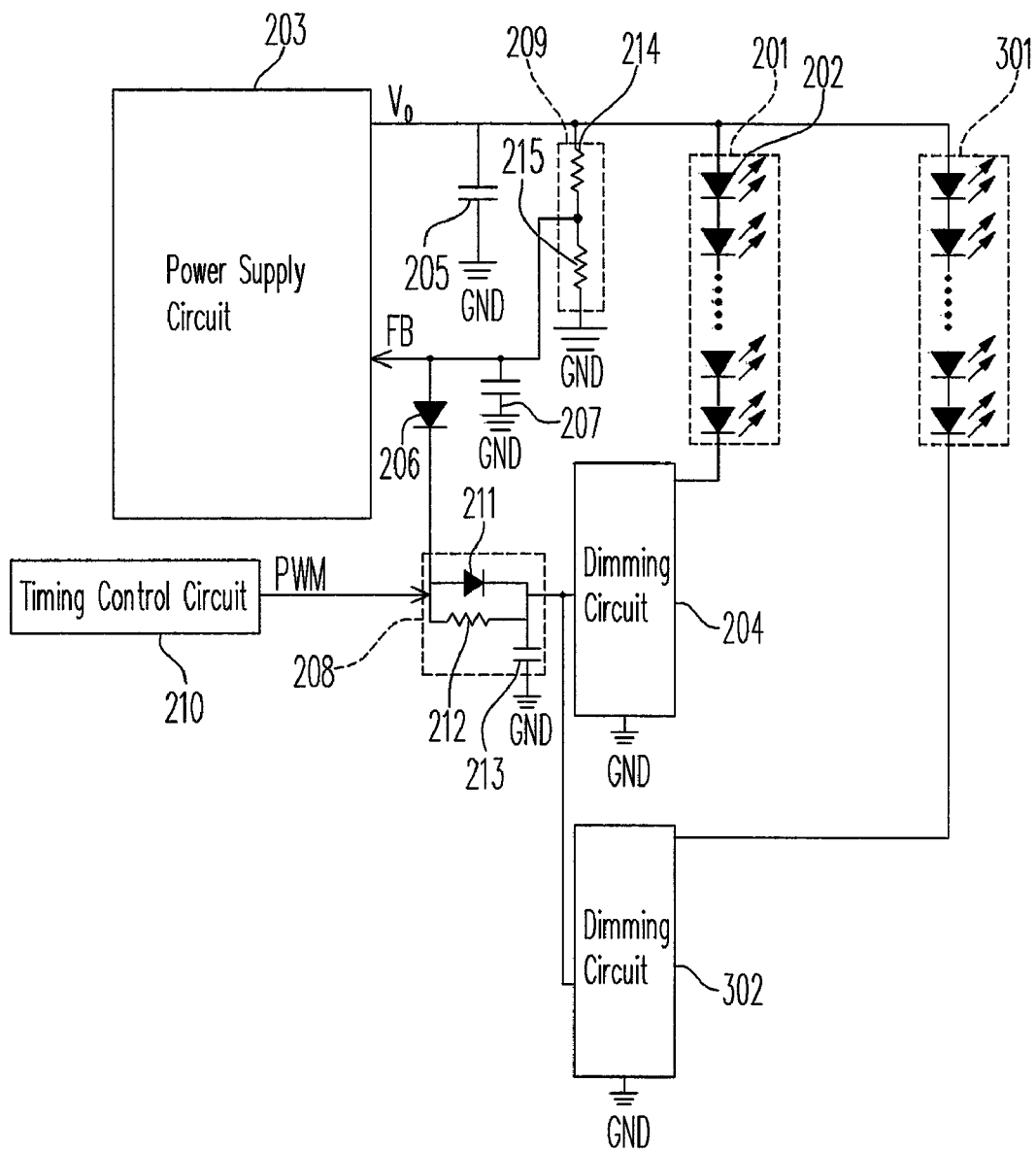
FIG. 3 is a circuit diagram of the light source driving circuit according to second embodiment of the present invention.

According to the teaching of the embodiment of FIG. 2, the present invention employs a plurality of dimming circuits in the light source driving circuit, so as to drive a plurality of light-emitting elements. As shown in FIG. 3, a light source driving circuit for driving two light-emitting elements is taken as an example to illustrate the present invention below.

FIG. 3 is a circuit diagram of the light source driving circuit according to another embodiment of the present invention. Referring to FIG. 3, the circuit of FIG. 3 includes a second light-emitting element 301 and a second dimming circuit 302 in addition to the circuit of FIG. 2, so as to form one light source driving circuit for driving two light-emitting elements. Here, the second light-emitting element 301 can be the same as the first light-emitting element 201.

Similarly, the second dimming circuit 302 has a first terminal, a second terminal, and a pulse width input terminal. The first terminal is connected to the other terminal of the second light-emitting element 301, the second terminal is connected to the common potential GND, and the pulse width signal input terminal is connected to the pulse width signal input terminal of the first dimming circuit 204. The second dimming circuit 302 determines the ON/OFF state between the first terminal and the second terminal according to the logic state of the pulse width signal. In this embodiments when the pulse width signal is in the logic high state, the electrical path between the first terminal and the second terminal of the second dimming circuit 302 is turned on; otherwise, the electrical path is not turned on. The operation mode of the circuit of FIG. 3 is illustrated briefly below, and the coupling relationship with the circuit of FIG. 2 will not be described herein again.

When the pulse width signal PWM assumes the logic high state, the first diode 206 is turned off, and the second diode 211 is ON. Therefore, the feedback signal FB assumes the divided voltage on the resistor 215, such that the power supply circuit 203 outputs the source voltage Vo normally, and charges the capacitor 205. As the second diode 211 is turned on at this time, the pulse width signal is transmitted to the pulse width signal input terminals of the first dimming circuit 204 and the second dimming circuit 302 through the second diode 211, and charges the capacitor 213. The first dimming circuit 204 and the second dimming circuit 302 start to sink current according to the pulse width signal PWM received by the pulse width signal input terminals, such that the first light-emitting element 201 and the second light-emitting element 301 are turned on respectively and emit light.

When the pulse width signal PWM assumes the logic low state, the first diode 206 is turned on, and the second diode 211 is turned off. Therefore, the voltage level of the feedback signal FB is reduced to the low level, such that the power supply circuit 203 stops outputting the source voltage Vo, and the capacitor 205 starts to discharge. Moreover, at the moment that the power supply circuit 203 stops outputting the source voltage, the source voltage Vo not disappeared and the capacitor 205 discharge through the resistor 214.

When the pulse width signal PWM assumes the logic low state, the second diode 211 is turned off. Therefore, the capacitor 213 starts to discharge through the pulse width signal input terminals of the first dimming circuit 204 and the second dimming circuit 302, and the resistor 212, such that the first dimming circuit 204 and the second dimming circuit 302 are delayed for a period of time to turn off by using the power stored in the capacitor 213. The difference between the time that the power supply circuit 203 stops outputting the source voltage Vo and the time that the first dimming circuit 204 is turned off is the product of the resistance of the resistor 212 and the capacitance of the capacitor 213. Similarly, the difference between the time that the power supply circuit 203 stops outputting the source voltage Vo and the time that the second dimming circuit 302 is turned off is also the product of the resistance of the resistor 212 and the capacitance of the capacitor 213. Thus, when the pulse width signal PWM assumes the logic low state, the breakdown of the first dimming circuit 204 and the second dimming circuit 302 caused by an over high source voltage Vo or the power stored in the capacitor 205 is prevented.

According to the teaching of the embodiment of FIG. 3, those of ordinary skill in the art may easily deduce that the present invention can also be implemented by a plurality of light-emitting elements and a plurality of dimming circuits.

FIG. 3 has described a configuration of the light source driving circuit for driving a plurality of light-emitting elements. However, on the basis of the teaching of the embodiment of FIG. 2, the present invention may be implemented by using the light source driving circuit of another configuration for driving a plurality of light-emitting elements. Here, a light source driving circuit for driving four light-emitting elements is taken as an example to illustrate the present invention, as shown in FIG. 4.

Figure 4:
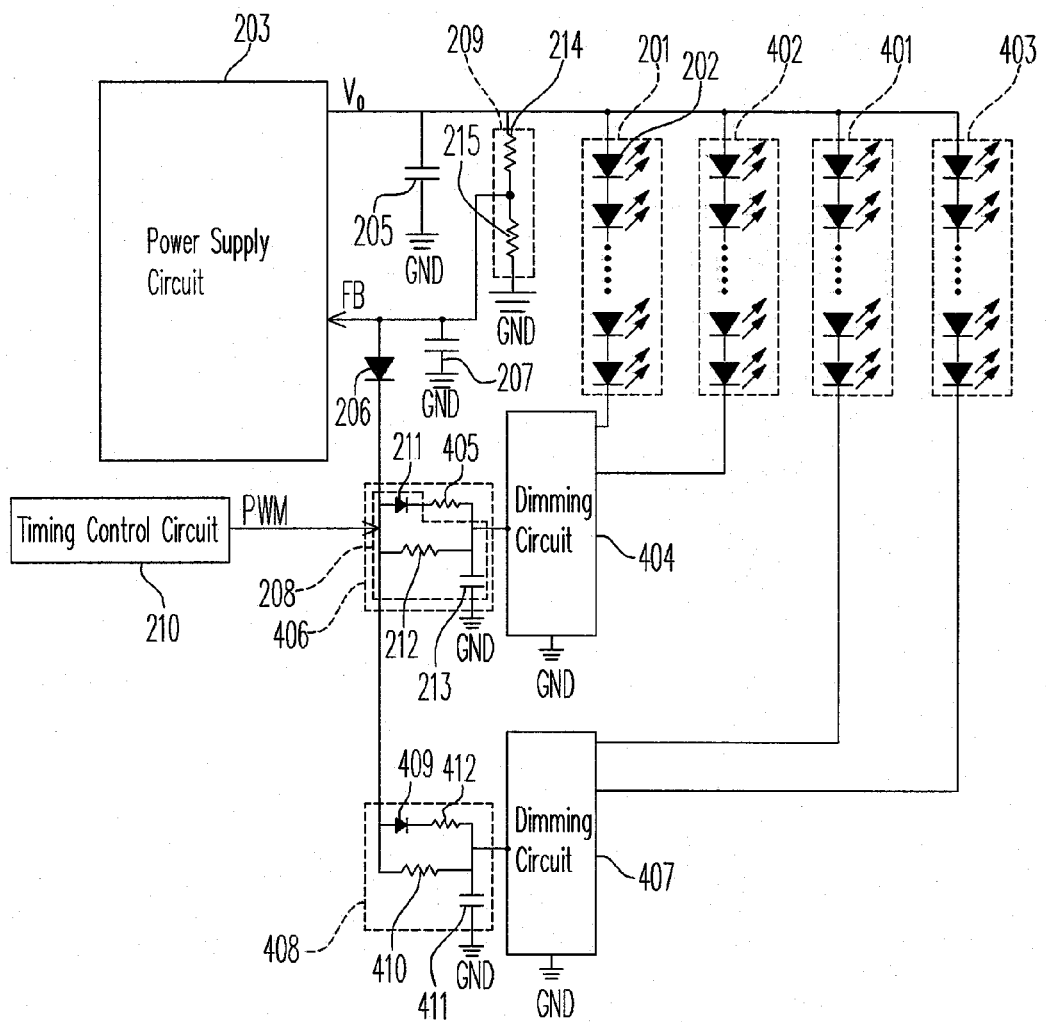
FIG. 4 is a circuit diagram of the light source driving circuit according to third embodiment of the present invention.

FIG. 4 is a circuit diagram of the light source driving circuit according to another embodiment of the present invention. Referring to FIG. 4, the circuit of FIG. 4 includes a second light-emitting element 401, a third light-emitting element 402, and a fourth light-emitting element 403 in addition to the circuit of FIG. 2. The second light-emitting element 401, the third light-emitting element 402, and the fourth light-emitting element 403 can be the same as the first light-emitting element 201. Moreover, in the light source driving circuit of FIG. 4, the first dimming circuit 204 of FIG. 2 is replaced by a first dimming circuit 404 having a first terminal, a second terminal, a third terminal, and a pulse width signal input terminal, and a resistor 405 is further connected in series between the cathode of the second diode 211 of the delay circuit 208 and the pulse width signal input terminal of the first dimming circuit 404 to form a first delay circuit 406.

In addition, in the embodiment of FIG. 4, a second dimming circuit 407 and a second delay circuit 408 are further used, and the second dimming circuit 407 also has a first terminal, a second terminal, a third terminal, and a pulse width signal input terminal. Each of the first dimming circuit 404 and the second dimming circuit 407 determines the ON/OFF state between the first terminal and the second terminal and the ON/OFF state between the third terminal and the second terminal according to the logic state of the pulse width signal. In this embodiment, when the pulse width signal is in the logic high state, the electrical path between the first terminal and the second terminal of the first dimming circuit 404 and the electrical path between the third terminal and the second terminal of the first dimming circuit 404 are turned on, and the electrical path between the first terminal and the second terminal of the second dimming circuit 407 and the electrical path between the third terminal and the second terminal of the second dimming circuit 407 are also turned on; otherwise, the electrical paths are not turned on. Moreover, the internal circuit design of the second delay circuit 408 is the same as that of the first delay circuit 406. The second delay circuit 408 includes a third diode 409, a resistor 410, a capacitor 411, and a resistor 412.

The first terminal of the first dimming circuit 404 is connected to the first light-emitting element 201, the second terminal of the first dimming circuit 404 is connected to the common potential GND, the third terminal of the first dimming circuit 404 is connected to the third light-emitting element 402, and the pulse width signal input terminal of the first dimming circuit 404 is connected to the resistor 405. The first terminal of the second dimming circuit 407 is connected to the second light-emitting element 401, the second terminal of the second dimming circuit 407 is connected to the common potential GND, the third terminal of the second dimming circuit 407 is connected to the fourth light-emitting element 403, and the pulse width signal input terminal of the second dimming circuit 407 is connected to the resistor 412.

According to the coupling scheme of the above elements, the light source driving circuit of FIG. 4 is capable of driving four light-emitting elements. However, the aforementioned first dimming circuit 404 and second dimming circuit 407 are not limited to include the first terminal, the second terminal, the third terminal, and the pulse width signal input terminal only, and can further include a first terminal, a second terminal, a third terminal, a fourth terminal, and a pulse width signal input terminal, or can further include a first terminal, a second terminal, a third terminal, a fourth terminal, a fifth terminal, and a pulse width signal input terminal, or can further include even more input terminals similar to the first terminal, the second terminal, and the third terminal, so as to couple with more light-emitting elements at the same time. However, it should be noted that once one dimming circuit is added, one delay circuit must be added correspondingly. The operation mode of the circuit of FIG. 4 is illustrated briefly below, and the coupling relationship of the circuit of FIG. 2 will not be described herein again.

When the pulse width signal PWM assumes the logic high state, the first diode 206 is turned off, and the second diode 211 and the third diode 409 are turned on. Therefore, the feedback signal FB assumes the divided voltage on the resistor 215, such that the power supply circuit 203 outputs the source voltage Vo normally, and charges the capacitor 205. At this time, the pulse width signal input terminals of the first dimming circuit 404 and the second dimming circuit 407 receive the pulse width signal PWM, and the capacitor 213 and the capacitor 411 are charged. The first dimming circuit 404 and the second dimming circuit 407 start to sink current according to the pulse width signal PWM received by the pulse width signal input terminals. Thus, the first light-emitting element 201 and the third light-emitting element 402 are turned on and emit light as the first dimming circuit 404 starts to sink current, and the second light-emitting element 401 and the fourth light-emitting element 403 are turned on and emit light as the second dimming circuit 407 starts to sink current.

When the pulse width signal PWM assumes the logic low state, the first diode 206 is turned on, and the second diode 211 and the third diode 409 are turned off. Therefore, the voltage level of the feedback signal FB is reduced to the low level, such that the power supply circuit 203 stops outputting the source voltage Vo, and the capacitor 205 starts to discharge. Moreover, at the moment that the power supply circuit 203 stops outputting the source voltage, the source voltage Vo not disappeared and the capacitor 205 discharge through the resistor 214.

When the pulse width signal PWM assumes the logic low state, the second diode 211 and the third diode 409 are turned off. Therefore, the capacitor 213 starts to discharge through the pulse width signal input terminal of the first dimming circuit 404 and the resistor 212, such that the first dimming circuit 404 is delayed for a period of time to turn off by using power stored in the capacitor 213. Meanwhile, the capacitor 411 also starts to discharge through the pulse width signal input terminal of the second dimming circuit 407 and the resistor 410, such that the second dimming circuit 407 is also delayed for a period of time to turn off by using power stored in the capacitor 411.

The difference between the time that the power supply circuit 203 stops outputting the source voltage Vo and the time that the first dimming circuit 404 is turned off is the product of the resistance of the resistor 212 and the capacitance of the capacitor 213. Similarly, the difference between the time that the power supply circuit 203 stops outputting the source voltage Vo and the time that the second dimming circuit 407 is turned off is the product of the resistance of the resistor 410 and the capacitance of the capacitor 411. Thus, when the pulse width signal PWM assumes the logic low state, the breakdown of the first dimming circuit 404 and the second dimming circuit 407 caused by an over high source voltage Vo or the power stored in the capacitor 205 is prevented.

It should be noted that the user can change the turn-on time of the first light-emitting element 201 and the third light-emitting element 402 by changing the resistance of the resistor 405, and can change the turn-on time of the second light-emitting element 401 and the fourth light-emitting element 403 by changing the resistance of the resistor 412. When the turn-on time is different, the value of inrush current generated at the output terminal of the power supply circuit 203 is reduced. However, the resistors 405 and 412 are not essential elements in the circuit, and can be used or not used according to actual requirements.

According to the teaching of the embodiment of FIG. 4, those of ordinary skill in the art can deduce that the present invention can also be implemented by a plurality of light-emitting elements and a plurality of dimming circuits.

Figure 6:
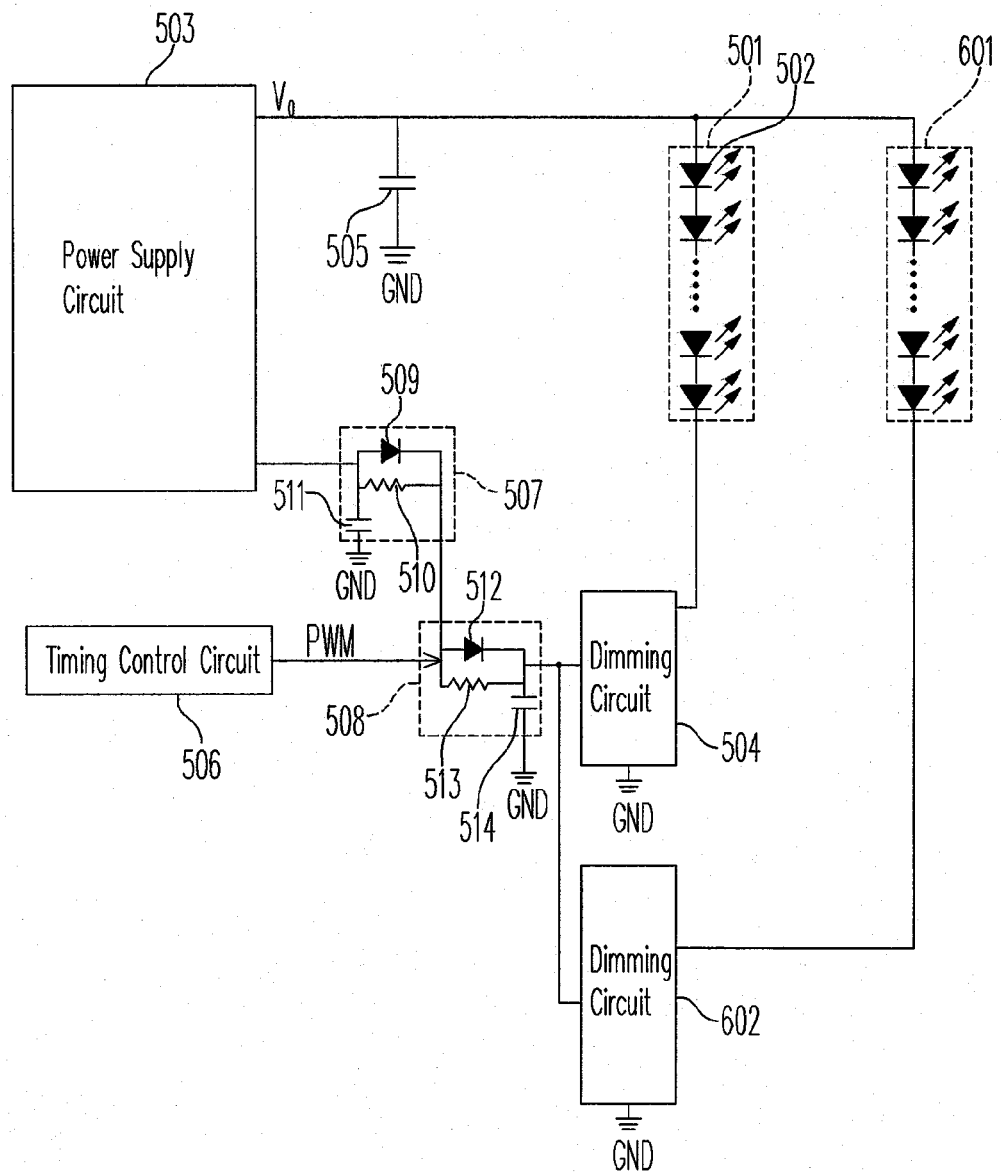
FIG. 6 is a circuit diagram of the light source driving circuit according to fifth embodiment of the present invention.
Figure 7:
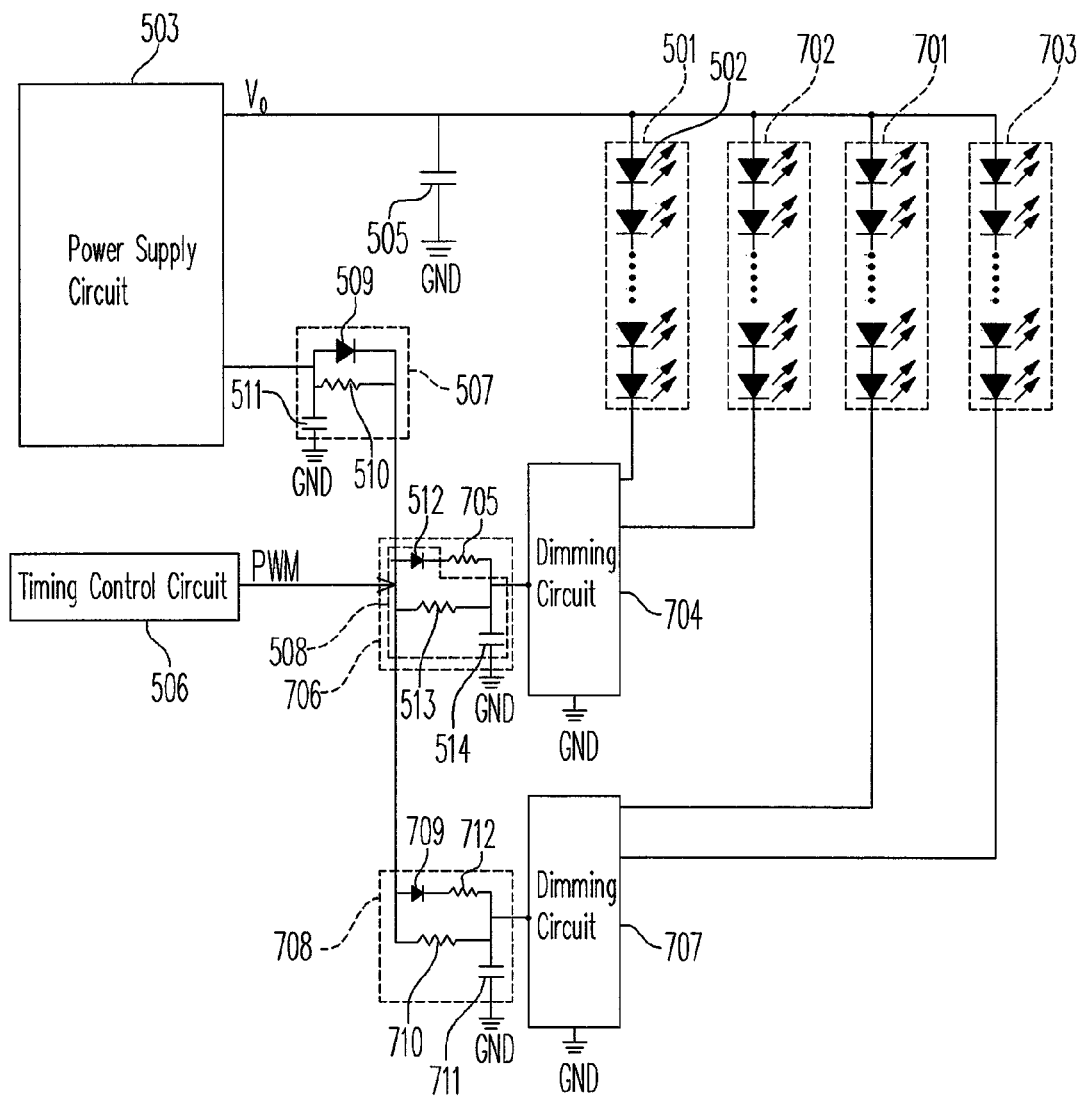
FIG. 7 is a circuit diagram of the light source driving circuit according to sixth embodiment of the present invention.

In addition to the circuit configurations of the light source driving circuit disclosed in the aforementioned embodiments, according to the teaching of the embodiment of FIG. 2, the user can also delay the power supply circuit to output the source voltage. Three embodiments of other configurations of the light source driving circuit will be illustrated below in the above manner, such that those of ordinary skill in the art may easily understand other possible implementation configurations of the present invention. The three exemplary embodiments are as shown in FIGS. 5, 6, and 7.

Figure 5:
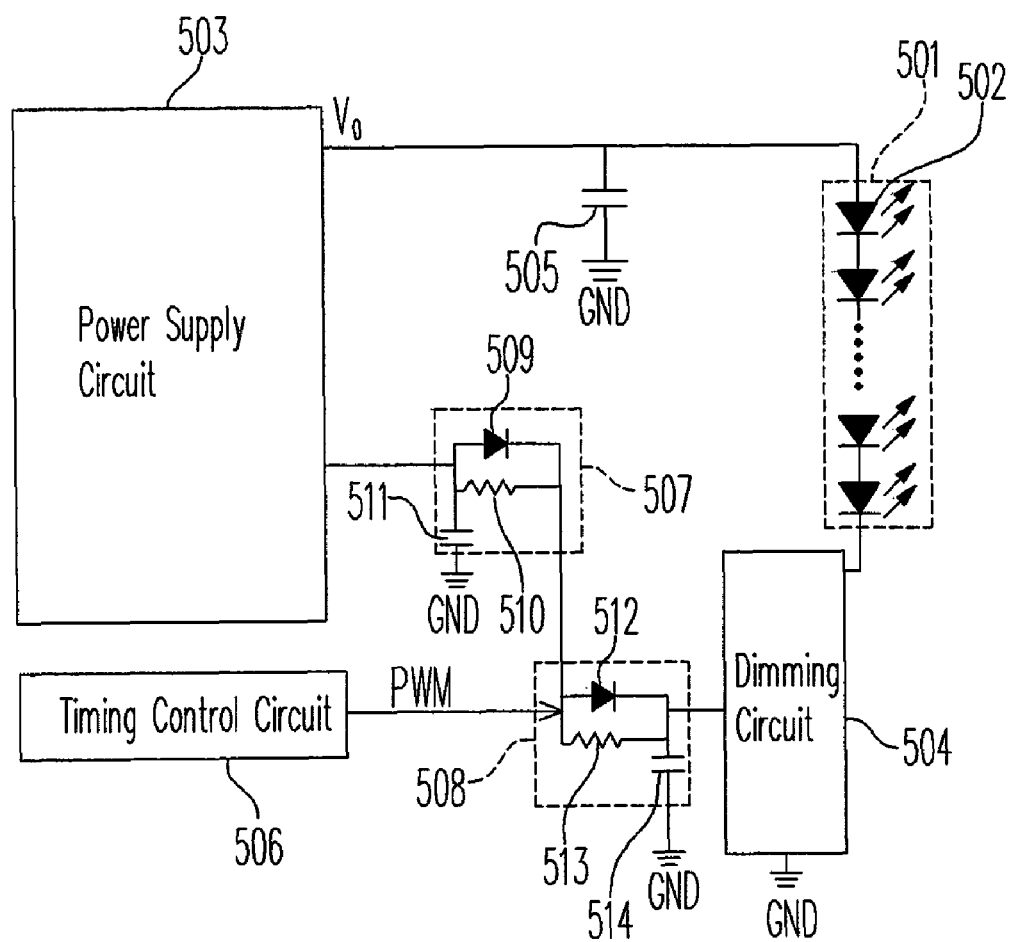
FIG. 5 is a circuit diagram of the light source driving circuit according to fourth embodiment of the present invention.

FIG. 5 is a circuit diagram of the light source driving circuit according to another embodiment of the present invention. Referring to FIG. 5, the light source driving circuit is used for driving a first light-emitting element 501. The first light-emitting element 501 can be an LED, shown as 502 in FIG. 5, or can be an LED string including a plurality of LEDs 502 strung together, or light-emitting elements/light-emitting element strings of other types.

The light source driving circuit includes a power supply circuit 503, a first dimming circuit 504, a capacitor 505, and a control circuit. The power supply circuit 503 includes an output terminal and a control terminal. The output terminal is connected to a terminal of the first light-emitting element 501, so as to supply a source voltage Vo to the first light-emitting element 501, and the power supply circuit 503 determines a value of the source voltage Vo according to a signal received by the control terminal. When the signal received by the control terminal of the power supply circuit 503 is in a logic high state (i.e., at a high level), the power supply circuit 503 outputs the source voltage Vo. When the signal received by the control terminal of the power supply circuit 503 is in a logic low state (i.e., at a low level), the power supply circuit 503 stops outputting the source voltage Vo. However, a user can change the operation mode of the power supply circuit 503 according to actual requirements. Moreover, the capacitor 505 is used for current rectifying, and is not an essential component in the circuit. The user can use or not use the capacitor 505 according to actual requirements.

In this embodiment, the first dimming circuit 504 has a first terminal, a second terminal, and a pulse width signal input terminal. The first terminal is connected to the other terminal of the first light-emitting element, and the second terminal is connected to a common potential GND. The second dimming circuit 504 determines the ON/OFF state between the first terminal and the second terminal according to the logic state of the pulse width signal. In this embodiment, when the pulse width signal is in the logic high state, the electrical path between the first terminal and the second terminal of the first dimming circuit 504 is turned on; otherwise, the electrical path is not turned on.

The pulse width signal PWM is provided by a timing control circuit 506, in which the timing control circuit 506 converts the luminance setting input by the user to the pulse width signal PWM. When the luminance is set to high, the time that the pulse width signal PWM assumes the logic high state (the high level) is long, such that the turn-on time of the first dimming circuit 504 is long, and the luminance of the first light-emitting element 501 is high. On the contrary, when the luminance is set to low, the time that the pulse width signal PWM assumes the logic high state is short, such that the turn-on time of the first dimming circuit 504 is short, and the luminance of the first light-emitting element 501 is low.

The aforementioned control circuit includes a first delay circuit 507 and a second delay circuit 508. The first delay circuit 507 receives the pulse width signal PWM, and transmits the pulse width signal PWM to the control terminal of the power supply circuit 503. Moreover, the first delay circuit 507 delays the power supply circuit 503 to output the source voltage Vo as the pulse width signal PWM assumes the logic high state (i.e., the first logic state, or the high level), and turns off the power supply circuit 503 to stop supplying the source voltage Vo as the pulse width signal PWM assumes the logic low state (i.e., the second logic state, or the low level). The second delay circuit 508 receives the pulse width signal PWM, and transmits the pulse width signal PWM to the pulse width signal input terminal of the first dimming circuit 504, and delays the first dimming circuit 504 to turn off as the pulse width signal assumes the second logic state.

The first delay circuit 507 includes a first diode 509, a first impedance element, and a second impedance element. A terminal of the first impedance element is connected to the anode of the first diode 509, and the other terminal of the first impedance element is connected to the cathode of the first diode 509. The second impedance element is connected between the anode of the first diode 509 and the common potential GND. Here, the first impedance element and the second impedance element are implemented by a resistor 510 and a capacitor 511 respectively. The second delay circuit 508 includes a second diode 512, a third impedance element, and a fourth impedance element. A terminal of the third impedance element is connected to the anode of the second diode 512, and the other terminal of the third impedance element is connected to the cathode of the second diode 512. The fourth impedance element is connected between the cathode of the second diode 512 and the common potential GND. Here, the third impedance element and the fourth impedance element are implemented by a resistor 513 and a capacitor 514 respectively.

When the pulse width signal PWM assumes the logic high state, the first diode 509 is turned off, and the second diode 512 is turned off. Therefore, the pulse width signal PWM can charge the capacitor 511 through the resistor 510 until the power stored in the capacitor 511 is enough to drive the power supply circuit 503 to output the source voltage Vo. Thus, t the power supply circuit 503 is delayed for a period of time to output the source voltage Vo. Moreover, when the pulse width signal PWM assumes the logic high state, the pulse width signal PWM can be transmitted to the pulse width signal input terminal of the first dimming circuit 504 through the second diode 512, and charges the capacitor 514. The first dimming circuit 504 starts to sink current according to the pulse width signal PWM received by the pulse width signal input terminal, such that the first light-emitting element 501 is turned on and emits light. According to the above description, the difference between the time that the power supply circuit 503 outputs the source voltage Vo and the time that the first dimming circuit 204 starts to sink current is the product of the resistance of the resistor 510 and the capacitance of the capacitor 511.

When the pulse width signal PWM assumes the logic low state, the first diode 509 is turned on, and the second diode 512 is turned off. At this time, the capacitor 505, the capacitor 511, and the capacitor 514 start to discharge. Furthermore, at this time, the control terminal of the power supply circuit 503 is directly connected to the low level through the first diode 509, so the power supply circuit 503 stops outputting the source voltage immediately. However, as the capacitor 514 discharges through the resistor 513, the discharging is rather slowly, and thus the first dimming circuit 504 is delayed for a period of time to turn off by using the power stored in the capacitor 514. The difference between the time that the power supply circuit 503 stops outputting the source voltage Vo and the time that the first dimming circuit 504 is turned off is the product of the resistance of the resistor 513 and the capacitance of the capacitor 514. Thus, when the pulse width signal PWM assumes the logic low state, the breakdown of the first dimming circuit 504 caused by an over high source voltage Vo or the power stored in the capacitor 505 is prevented.

According to the teaching of the embodiment of FIG. 5, the present invention can use a plurality of dimming circuits in the light source driving circuit, so as to drive a plurality of light-emitting elements. As shown in FIG. 6, a light source driving circuit for driving two light-emitting elements is taken as an example to illustrate the present invention below.

FIG. 6 is a circuit diagram of the light source driving circuit according to another embodiment of the present invention. Referring to FIG. 6, the circuit of FIG. 6 includes a second light-emitting element 601 and a second dimming circuit 602 in addition to the circuit of FIG. 5, so as to form a light source driving circuit for driving two light-emitting elements. Here, the second light-emitting element 601 can be the same as the first light-emitting element 501.

Similarly, the second dimming circuit 602 has a first terminal, a second terminal, and a pulse width input terminal. The first terminal is connected to the other terminal of the second light-emitting element 601, the second terminal is connected to the common potential GND, and the pulse width signal input terminal is connected to the pulse width signal input terminal of the first dimming circuit 504. The second dimming circuit 602 also determines the ON/OFF state between the first terminal and the second terminal according to the logic state of the pulse width signal. In this embodiment, when the pulse width signal is in the logic high state, the electrical path between the first terminal and the second terminal of the second dimming circuit 602 is turned on; otherwise, the electrical path is not turned on. The operation mode of the circuit of FIG. 6 is illustrated briefly below, and the coupling relationship of the circuit of FIG. 5 will not be described herein again.

When the pulse width signal PWM assumes the logic high state, the first diode 509 is turned off, and the second diode 512 is turned on. Therefore, the pulse width signal PWM can charge the capacitor 511 through the resistor 510 until the power stored in the capacitor 511 is enough to drive the power supply circuit 503 to output the source voltage Vo. Thus, the power supply circuit 503 is delayed for a period of time to output the source voltage Vo.

Moreover, when the pulse width signal PWM assumes the logic high state, the pulse width signal PWM can be transmitted to the pulse width signal input terminals of the first dimming circuit 504 and the second dimming circuit 602 through the second diode 512, and charges the capacitor 514. The first dimming circuit 504 and the second dimming circuit 602 start to sink current according to the pulse width signal PWM received by the pulse width signal input terminals, such that the first light-emitting element 501 and the second light-emitting element 601 are turned on respectively and emit light. According to the above description, the difference between the time that the power supply circuit 503 outputs the source voltage Vo and the time that the first dimming circuit 504 starts to sink current is the product of the resistance of the resistor 510 and the capacitance of the capacitor 511, and the difference between the time that the power supply circuit 503 outputs the source voltage Vo and the time that the second dimming circuit 601 starts to sink current is also the product of the resistance of the resistor 510 and the capacitance of the capacitor 511.

When the pulse width signal PWM assumes the logic low state, the first diode 509 is turned on, and the second diode 512 is turned off. At this time, the capacitor 505, the capacitor 511, and the capacitor 514 start to discharge. Furthermore, at this time, the control terminal of the power supply circuit 503 is directly connected to the low level through the first diode 509, so the power supply circuit 503 stops outputting the source voltage immediately. However, as the capacitor 514 discharges through the resistor 513, the discharging is rather slow, and thus the first dimming circuit 504 and the second dimming circuit 602 are delayed for a period of time to turn off by using the power stored in the capacitor 514.

The difference between the time that the power supply circuit 503 stops outputting the source voltage Vo and the time that the first dimming circuit 504 is turned off is the product of the resistance of the resistor 513 and the capacitance of the capacitor 514, and the difference between the time that the power supply circuit 503 stops outputting the source voltage Vo and the time that the second dimming circuit 602 is turned off is also the product of the resistance of the resistor 513 and the capacitance of the capacitor 514. Thus, when the pulse width signal PWM assumes the logic low state, the breakdown of the first dimming circuit 504 and the second dimming circuit 602 caused by an over high source voltage Vo or the power stored in the capacitor 505 is prevented.

According to the teaching of the embodiment of FIG. 6, those of ordinary skill in the art may easily deduce that the present invention can also be implemented by a plurality of light-emitting elements and a plurality of dimming circuits.

FIG. 6 has described a configuration of one light source driving circuit for driving a plurality of light-emitting elements. However, on the basis of the teaching of the embodiment of FIG. 5, the present invention still has another configuration of the light source driving circuit for driving a plurality of light-emitting elements. Here, a light source driving circuit for driving four light-emitting elements is taken as an example to illustrate the present invention, as shown in FIG. 7.

FIG. 7 is a circuit diagram of the light source driving circuit according to another embodiment of the present invention. Referring to FIG. 7, the circuit of FIG. 7 includes a second light-emitting element 701, a third light-emitting element 702, and a fourth light-emitting element 703 in addition to the circuit of FIG. 5. Here, the second light-emitting element 701, the third light-emitting element 702, and the fourth light-emitting element 703 can be the same as the first light-emitting element 501. Moreover, in the light source driving circuit of FIG. 7, the first dimming circuit 504 of FIG. 5 is replaced by a first dimming circuit 704 having a first terminal, a second terminal, a third terminal, and a pulse width signal input terminal, and one resistor 705 is further connected in series between the cathode of the second diode 512 of the second delay circuit 508 and the pulse width signal input terminal of the first dimming circuit 704 to form a first delay circuit 706.

In addition, in the embodiment of FIG. 7, a second dimming circuit 707 and a third delay circuit 708 are further used, and the second dimming circuit 707 also has a first terminal, a second terminal, a third terminal, and a pulse width signal input terminal. Each of the first dimming circuit 704 and the second dimming circuit 707 determines the ON/OFF state between the first terminal and the second terminal and the ON/OFF state between the third terminal and the second terminal according to the logic state of the pulse width signal. In this embodiment, when the pulse width signal is in the logic high state, the electrical path between the first terminal and the second terminal of the first dimming circuit 704 and the electrical path between the third terminal and the second terminal of the first dimming circuit 704 are turned on, and the electrical path between the first terminal and the second terminal of the second dimming circuit 707 and the electrical path between the third terminal and the second terminal of the second dimming circuit 707 are also turned on; otherwise, the electrical paths are not turned on. Moreover, the internal circuit design of the third delay circuit 708 is the same as that of the second delay circuit 706. The third delay circuit 708 includes a third diode 709, a resistor 710, a capacitor 711, and a resistor 412.

The first terminal of the first dimming circuit 704 is connected to the first light-emitting element 501, the second terminal of the first dimming circuit 704 is connected to the common potential GND, the third terminal of the first dimming circuit 704 is connected to the third light-emitting element 702, and the pulse width signal input terminal of the first dimming circuit 704 is connected to the resistor 705. The first terminal of the second dimming circuit 707 is connected to the second light-emitting element 701, the second terminal of the second dimming circuit 707 is connected to the common potential GND, the third terminal of the second dimming circuit 707 is connected to the fourth light-emitting element 703, and the pulse width signal input terminal of the second dimming circuit 707 is connected to the resistor 712.

According to the coupling scheme of the above elements, the light source driving circuit of FIG. 7 is capable of driving four light-emitting elements. However, each of the aforementioned first dimming circuit 704 and second dimming circuit 707 is not limited to include the first terminal, the second terminal, the third terminal, and the pulse width signal input terminal only, and can further include a first terminal, a second terminal, a third terminal, a fourth terminal, and a pulse width signal input terminal, or can further include a first terminal, a second terminal, a third terminal, a fourth terminal, a fifth terminal, and a pulse width signal input terminal, or can further include even more input terminals similar to the first terminal, the second terminal, and the third terminal, so as to couple with more number of light-emitting elements at the same time. However, it should be noted that once one dimming circuit is added, one delay circuit must be added correspondingly. The operation mode of the circuit of FIG. 7 is illustrated briefly below, and the coupling relationship of the circuit of FIG. 5 will not be described herein again.

When the pulse width signal PWM assumes the logic high state, the first diode 509 is turned off, and the second diode 512 and the third diode 709 are turned on. Therefore, the pulse width signal PWM can charge the capacitor 511 through the resistor 510 until the power stored in the capacitor 511 is enough to drive the power supply circuit 503 to output the source voltage Vo. Thus, the power supply circuit 503 is delayed for a period of time to output the source voltage Vo. Then, when the power supply circuit 203 outputs the source voltage Vo, the capacitor 205 is charged.

Moreover, when the pulse width signal PWM assumes the logic high state, the pulse width signal input terminals of the first dimming circuit 704 and the second dimming circuit 707 receive the pulse width signal PWM, and the capacitors 514 and 711 are charged. The first dimming circuit 704 and the second dimming circuit 707 start to sink current according to the pulse width signal PWM received by the pulse width signal input terminals. Thus, the first light-emitting element 501 and the third light-emitting element 702 are turned on and emit light as the first dimming circuit 704 starts to sink current, and the second light-emitting element 701 and the fourth light-emitting element 703 are turned on and emit light as the second dimming circuit 707 starts to sink current.

According to the above description, the difference between the time that the power supply circuit 503 outputs the source voltage Vo and the time that the first dimming circuit 704 starts to sink current is the product of the resistance of the resistor 510 and the capacitance of the capacitor 511, and the difference between the time that the power supply circuit 503 outputs the source voltage Vo and the time that the second dimming circuit 707 starts to sink current is also the product of the resistance of the resistor 510 and the capacitance of the capacitor 511.

When the pulse width signal PWM assumes the logic low state, the first diode 509 is turned on, and the second diode 512 and the third diode 709 are turned off. At this time, the capacitor 505, the capacitor 511, the capacitor 514, and the capacitor 711 start to discharge. Furthermore, at this time, the control terminal of the power supply circuit 503 is directly connected to the low level through the first diode 509, so the power supply circuit 503 stops outputting the source voltage immediately. However, as the capacitor 514 discharges through the resistor 513 and the capacitor 711 discharges through the resistor 710, the discharging of the capacitor 514 and the capacitor 711 is rather slowly, and thus the first dimming circuit 704 is delayed for a period of time to turn off by using the power stored in the capacitor 514, and the second dimming circuit 707 is also delayed for a period of time to turn off by using the power stored in the capacitor 711.

The difference between the time that the power supply circuit 503 stops outputting the source voltage Vo and the time that the first dimming circuit 704 is turned off is the product of the resistance of the resistor 513 and the capacitance of the capacitor 514, and the difference between the time that the power supply circuit 503 stops outputting the source voltage Vo and the time that the second dimming circuit 707 is turned off is the product of the resistance of the resistor 710 and the capacitance of the capacitor 711. Thus, when the pulse width signal PWM assumes the logic low state, the breakdown of the first dimming circuit 704 and the second dimming circuit 707 caused by an over high source voltage Vo or the power stored in the capacitor 505 is prevented.

It should be noted that the user can change the turn-on time of the first light-emitting element 501 and the third light-emitting element 705 by changing the resistance of the resistor 702, and can change the turn-on time of the second light-emitting element 701 and the fourth light-emitting element 703 by changing the resistance of the resistor 712. When the turn-on time is different, the value of inrush current generated by the output terminal of the power supply circuit 503 is reduced. However, the resistors 705 and 712 are not essential elements in the circuit, and can be used or not used according to actual requirements.

Though the above embodiments provide a plurality of possible implementation configurations of the feedback circuit and the control circuit, it is known to those of ordinary skill in the art that various manufacturers design the feedback circuit and the control circuit differently. Therefore, the feedback circuit or control circuit conforms to the spirit of the present invention, as long as the designed feedback circuit or control circuit can delay the dimming circuits to turn off when the power supply circuit stop outputting the source voltage to prevent the breakdown of the dimming circuits by over high voltage.

In addition, the power supply circuits in the aforementioned embodiments are not limited to a specific type of power supply circuits. The buck, boost, and buck-boost power supply circuits, various topologies, such as forward, flyback, semi-bridge, and full-bridge, derived from the aforementioned power supply circuits, or linear voltage regulators can all be used to implement the embodiments of the present invention.

In addition, the power supply circuit 503 of the embodiments of FIGS. 5, 6, and 7 can also be a switch-type power source supply circuit having an input terminal, and the input terminal is connected to an external power source. Moreover, the power supply circuit 503 determines whether or not to couple the external power source received by the input terminal directly to the output terminal of the power supply circuit 503 to function as the source voltage Vo according to the logic state of the signal received by the control terminal.

To sum up, in the present invention, when the power supply is turned off so as to stop outputting the source voltage to the light-emitting element, the dimming circuit is delayed to turn off. Therefore, the light source driving circuit can prevent from breakdown of the dimming circuit caused by an over high voltage. The damage of inner components of the light source driving circuit is prevented, and the service life of the light source driving circuit is prolonged. Moreover, the light source driving circuit does not need the dimming circuit with high voltage tolerance, thus reducing the cost of the inner components of the light source driving circuit, and improving the competitiveness of the product.

It will be apparent to persons of ordinary art in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light source driving circuit, for driving a first light-emitting element, the light source driving circuit comprising:
   a power supply circuit, having an output terminal and a control terminal, wherein the output terminal is connected to a terminal of the first light-emitting element to supply a voltage to the first light-emitting element;
   a first dimming circuit, having a first terminal, a second terminal, and a pulse width signal input terminal, wherein the first terminal is connected to the other terminal of the first light-emitting element and the second terminal is connected to a common potential; and
   a control circuit, connected between the pulse width input terminal of the first dimming circuit and the control terminal of the power supply circuit, for receiving and transmitting a pulse width signal to the pulse width signal input terminal of the first dimming circuit and the control terminal of the power supply circuit, such that the first dimming circuit determines an ON/OFF state between the first terminal and the second terminal according to a logic state of the pulse width signal, and the power supply circuit determines whether or not to output the voltage according to the pulse width signal received by the control terminal, and the control circuit delays the power supply circuit to output the voltage according to a first logic state of the pulse width signal, and turns off the power supply circuit to stop supplying the voltage and delays the first dimming circuit to turn off according to a second logic state of the pulse width signal.

2. The light source driving circuit as claimed in claim 1, wherein the control circuit comprises:
   a first delay circuit, connected between the control terminal of the power supply circuit and the pulse width signal, for receiving and transmitting the pulse width signal to the control terminal of the power supply circuit, delaying the power supply circuit to output the voltage as the pulse width assumes the first logic state, and turning off the power supply circuit to stop supplying the voltage as the pulse width signal assumes the second logic state; and
   a second delay circuit, connected between the pulse width signal input terminal of the first dimming circuit and the pulse width signal, for receiving and transmitting the pulse width signal to the pulse width signal input terminal of the first dimming circuit, and delaying the first dimming circuit to turn off as the pulse width signal assumes the second logic state.

3. The light source driving circuit as claimed in claim 2, wherein the first delay circuit comprises:
   a first diode, with an anode connected to the control terminal of the power supply circuit and a cathode receiving the pulse width signal;
   a first impedance element, with a terminal connected to the anode of the first diode and the other terminal connected to the cathode of the first diode; and
   a second impedance element, connected between the anode of the first diode and the common potential.

4. The light source driving circuit as claimed in claim 3, wherein the first impedance element comprises a resistor and the second impedance element comprises a capacitor.

5. The light source driving circuit as claimed in claim 2, wherein the second delay circuit comprises:
   a second diode, with an anode connected to the pulse width signal and a cathode connected to the pulse width signal input terminal of the first dimming circuit;
   a third impedance element, with a terminal connected to the anode of the second diode and another terminal connected to the cathode of the second diode; and
   a fourth impedance element, connected between the cathode of the second diode and the common potential.

6. The light source driving circuit as claimed in claim 5, wherein the third impedance element comprises a resistor and the fourth impedance element comprises a capacitor.

7. The light source driving circuit as claimed in claim 1, further comprising:
   a timing control circuit, connected to the control circuit, for converting a luminance setting input by a user into the pulse width signal.

8. The light source driving circuit as claimed in claim 1, wherein the first light-emitting element is an LED which has an anode connected to the output terminal of the power supply circuit.

9. The light source driving circuit as claimed in claim 1, wherein the first light-emitting element is a plurality of LEDs strung together anode to cathode, and an anode of the first LED is connected to the output terminal of the power supply circuit.

10. The light source driving circuit as claimed in claim 1, further for driving a second light-emitting element, wherein a terminal of the second light-emitting element is connected to the output terminal of the power supply circuit, the light source driving circuit further comprising:
    a second dimming circuit, having a first terminal, a second terminal, and a pulse width signal input terminal, wherein the first terminal is connected to another terminal of the second light-emitting element and the second terminal is connected to the common potential.

11. The light source driving circuit as claimed in claim 10, wherein the control circuit comprises:
    a first delay circuit, connected between the control terminal of the power supply circuit and the pulse width signal, for receiving and transmitting the pulse width signal to the control terminal of the power supply circuit, delaying the power supply circuit to output the voltage as the pulse width assumes the first logic state, and turning off the power supply circuit to stop supplying the voltage as the pulse width signal assumes the second logic state; and
    a second delay circuit, connected among the pulse width signal input terminal of the first dimming circuit, the pulse width signal input terminal of the second dimming circuit, and the pulse width signal, for receiving and transmitting the pulse width signal to the pulse width signal input terminals of the first dimming circuit and the second dimming circuit, and delaying the first dimming circuit and the second dimming circuit to turn off as the pulse width signal assumes the second logic state.

12. The light source driving circuit as claimed in claim 11, wherein the first delay circuit comprises:
    a first diode, with an anode connected to the control terminal of the power supply circuit and a cathode receiving the pulse width signal;
    a first impedance element, with a terminal connected to the anode of the first diode and another terminal connected to the cathode of the first diode; and
    a second impedance element, connected between the anode of the first diode and the common potential.

13. The light source driving circuit as claimed in claim 12, wherein the first impedance element comprises a resistor and the second impedance element comprises a capacitor.

14. The light source driving circuit as claimed in claim 11, wherein the second delay circuit comprises:
    a second diode, with an anode connected to the pulse width signal and a cathode connected to the pulse width signal input terminals of the first dimming circuit and the second dimming circuit;
    a third impedance element, with a terminal connected to the anode of the second diode and another terminal connected to the cathode of the second diode; and
    a fourth impedance element, connected between the cathode of the second diode and the common potential.

15. The light source driving circuit as claimed in claim 14, wherein the third impedance element comprises a resistor and the fourth impedance element comprises a capacitor.

16. The light source driving circuit as claimed in claim 10, further comprising:
    a timing control circuit, connected to the control circuit, for converting a luminance setting input by a user into the pulse width signal.

17. The light source driving circuit as claimed in claim 10, wherein the first light-emitting element and the second light-emitting element respectively comprise an LED, and the anodes of the first light-emitting element and the second light-emitting element are both connected to the output terminal of the light supply circuit.

18. The light source driving circuit as claimed in claim 10, wherein the first light-emitting element and the second light-emitting element respectively comprises a plurality of LEDs, the LEDs of the first light-emitting element and the second light-emitting element are strung together anode to cathode, and the anode of the first LED of the first light-emitting element and the anode of the first LED of the second light-emitting element are both connected to the output terminal of the power supply circuit.

19. The light source driving circuit as claimed in claim 10, further for driving a third light-emitting element and a fourth light-emitting element, wherein a terminal of the third light-emitting element and a terminal of the fourth light-emitting element are both connected to the output terminal of the power supply circuit, and the first dimming circuit and the second dimming circuit further respectively comprises a third terminal, the third terminal of the first dimming circuit is connected to the other terminal of the third light-emitting element, the third terminal of the second dimming circuit is connected to the other terminal of the fourth light-emitting element, and both the first dimming circuit and the second dimming circuit determine an ON/OFF state between the third terminal and the second terminal according to the logic state of the pulse width signal.

20. The light source driving circuit as claimed in claim 19, wherein the control circuit comprises:
 a first delay circuit, connected between the control terminal of the power supply circuit and the pulse width signal, for receiving and transmitting the pulse width signal to the control terminal of the power supply circuit, delaying the power supply circuit to output the voltage as the pulse width assumes the first logic state, and turning off the power supply circuit to stop supplying the voltage as the pulse width signal assumes the second logic state;
 a second delay circuit, connected between the pulse width signal input terminal of the first dimming circuit and the pulse width signal, for receiving and transmitting the pulse width signal to the pulse width signal input terminal of the first dimming circuit and delaying the first dimming circuit to turn off as the pulse width signal assumes the second logic state; and
 a third delay circuit, connected between the pulse width signal input terminal of the second dimming circuit and the pulse width signal, for receiving and transmitting the pulse width signal to the pulse width signal input terminal of the second dimming circuit and delaying the second dimming circuit to turn off as the pulse width signal assumes the second logic state.

21. The light source driving circuit as claimed in claim 20, wherein the first delay circuit comprises:
 a first diode, with an anode connected to the control terminal of the power supply circuit and a cathode receiving the pulse width signal;
 a first impedance element, with a terminal connected to the anode of the first diode and another terminal connected to the cathode of the first diode; and
 a second impedance element, connected between the anode of the first diode and the common potential.

22. The light source driving circuit as claimed in claim 21, wherein the first impedance element comprises a resistor and the second impedance element comprises a capacitor.

23. The light source driving circuit as claimed in claim 20, wherein the second delay circuit comprises:
 a second diode, with an anode connected to the pulse width signal and a cathode connected to the pulse width signal input terminal of the first dimming circuit;
 a third impedance element, with a terminal connected to the anode of the second diode and another terminal connected to the cathode of the second diode; and
 a fourth impedance element, connected between the cathode of the second diode and the common potential.

24. The light source driving circuit as claimed in claim 23, wherein the third impedance element comprises a resistor and the fourth impedance element comprises a capacitor.

25. The light source driving circuit as claimed in claim 24, wherein the second delay circuit further comprises a fifth impedance element connected between the cathode of the second diode and the pulse width signal input terminal of the first dimming circuit.

26. The light source driving circuit as claimed in claim 25, wherein the fifth impedance element comprises a resistor.

27. The light source driving circuit as claimed in claim 20, wherein the third delay circuit comprises:
 a third diode, with an anode connected to the pulse width signal and a cathode connected to the pulse width signal input terminal of the second dimming circuit;
 a sixth impedance element, with a terminal connected to the anode of the third diode and another terminal connected to the cathode of the third diode; and
 a seventh impedance element, connected between the cathode of the third diode and the common potential.

28. The light source driving circuit as claimed in claim 27, wherein the sixth impedance element comprises a resistor and the seventh impedance element comprises a capacitor.

29. The light source driving circuit as claimed in claim 28, wherein the third delay circuit further comprises an eighth impedance element connected between the cathode of the third diode and the pulse width signal input terminal of the second dimming circuit.

30. The light source driving circuit as claimed in claim 29, wherein the eighth impedance element comprises a resistor.

31. The light source driving circuit as claimed in claim 19, further comprising:
 a timing control circuit, connected to the control circuit, for converting a luminance setting input by a user into the pulse width signal.

32. The light source driving circuit as claimed in claim 19, wherein each of the first light-emitting element, the second light-emitting element, the third light-emitting element, and the fourth light-emitting element is an LED, and the anodes of the first light-emitting element, the second light-emitting element, the third light-emitting element, and the fourth light-emitting element are all connected to the output terminal of the power supply circuit.

33. The light source driving circuit as claimed in claim 19, wherein each of the first light-emitting element, the second light-emitting element, the third light-emitting element, and the fourth light-emitting element comprises a plurality of LEDs, and the LEDs of the first light-emitting element, the second light-emitting element, the third light-emitting element, and the fourth light-emitting element are strung together anode to cathode, and the anode of the first LED of the first light-emitting element, the anode of the first LED of the second light-emitting element, the anode of the first LED of the third light-emitting element, and the anode of the first LED of the fourth light-emitting element are all connected to the output terminal of the power supply circuit.

* * * * *